US012616157B2

(12) United States Patent
Stuessel et al.

(10) Patent No.: US 12,616,157 B2
(45) Date of Patent: May 5, 2026

(54) MILKING SYSTEM AND METHODS WITH PRE- AND POST-DIP IN THE TEAT LINER

(71) Applicant: GEA FARM TECHNOLOGIES, INC., Romeoville, IL (US)

(72) Inventors: Matthew J. Stuessel, Alma Center, WI (US); Jeffrey S. Hanson, Melrose, WI (US)

(73) Assignee: GEA FARM TECHNOLOGIES, INC., Romeoville, IL (US)

( * ) Notice: Subject to any disclaimer, the term of this patent is extended or adjusted under 35 U.S.C. 154(b) by 0 days.

(21) Appl. No.: 18/687,527

(22) PCT Filed: Aug. 30, 2022

(86) PCT No.: PCT/US2022/041973
§ 371 (c)(1),
(2) Date: Feb. 28, 2024

(87) PCT Pub. No.: WO2023/034254
PCT Pub. Date: Mar. 9, 2023

(65) Prior Publication Data
US 2025/0127137 A1 Apr. 24, 2025

Related U.S. Application Data

(60) Provisional application No. 63/239,214, filed on Aug. 31, 2021.

(51) Int. Cl.
| | |
|---|---|
| *A01J 5/007* | (2006.01) |
| *A01J 5/10* | (2006.01) |
| *A01J 9/00* | (2006.01) |
| *A01K 1/12* | (2006.01) |

(52) U.S. Cl.
CPC ................. *A01J 5/007* (2013.01); *A01J 5/10* (2013.01); *A01J 9/00* (2013.01); *A01K 1/126* (2013.01)

(58) Field of Classification Search
None
See application file for complete search history.

(56) References Cited

U.S. PATENT DOCUMENTS

| | | | |
|---|---|---|---|
| 5,881,669 | A | 3/1999 | van den Berg et al. |
| 8,025,029 | B2 | 9/2011 | Torgerson et al. |
| 8,033,247 | B2 | 10/2011 | Torgerson et al. |

(Continued)

FOREIGN PATENT DOCUMENTS

| | | |
|---|---|---|
| WO | 9931966 A1 | 7/1999 |
| WO | 9966787 A1 | 12/1999 |
| WO | 2015091319 A1 | 6/2015 |

OTHER PUBLICATIONS

International Search Report and Written Opinion mailed Dec. 22, 2022 in related/corresponding International Application No. PCT/US2022/041973.

(Continued)

*Primary Examiner* — Magdalena Topolski
(74) *Attorney, Agent, or Firm* — PATENT PORTFOLIO BUILDERS PLLC

(57) ABSTRACT

Milking diary animals involves manually attaching a milking cluster to the dairy animals teats. While the dairy animal's teats are in the liners of the teat cups, pre-dip, milking, and post-dip processes are performed. The milking cluster then detaches from the dairy animal's teats. The system can be implemented in a parallel line, rotary, or herringbone parlor configuration.

14 Claims, 15 Drawing Sheets

(56) References Cited

U.S. PATENT DOCUMENTS

| | | |
|---|---|---|
| 8,117,989 B2 | 2/2012 | Torgerson et al. |
| 8,342,125 B2 | 1/2013 | Torgerson et al. |
| 9,686,958 B2 | 6/2017 | Sellner et al. |
| 9,763,421 B2 | 9/2017 | Torgerson et al. |
| 10,502,330 B2 | 12/2019 | Balkenhol |
| 10,874,084 B2 | 12/2020 | Torgerson et al. |
| 2005/0045108 A1 | 3/2005 | Wipperfurth et al. |
| 2007/0277737 A1 | 12/2007 | Maier et al. |
| 2009/0050061 A1 | 2/2009 | Duke |
| 2009/0320760 A1 | 12/2009 | Torgerson et al. |
| 2013/0263788 A1 | 10/2013 | Buck et al. |
| 2016/0319947 A1 | 11/2016 | Balkenhol |
| 2019/0133067 A1 | 5/2019 | Stuessel et al. |
| 2019/0133069 A1 | 5/2019 | Stuessel et al. |
| 2020/0352129 A1 | 11/2020 | Torgerson et al. |

OTHER PUBLICATIONS

International Preliminary Report on Patentability mailed Jul. 25, 2024 in related/corresponding International Application No. PCT/US2022/041973.

Anonymous; "Pre- and Post-Milking Teat Disinfection;" Oct. 5, 2019; https://web.archive.org/web/20191005051723/http://www.reseaumammite.org/tactic/en/pre-and-post-milking-treat-disinfection/.

Extended European Search Report dated Jun. 13, 2025 in related/corresponding EP Application No. 22865406.7.

Office Action dated Dec. 8, 2025 in related/corresponding CN Application No. 202280058908.0.

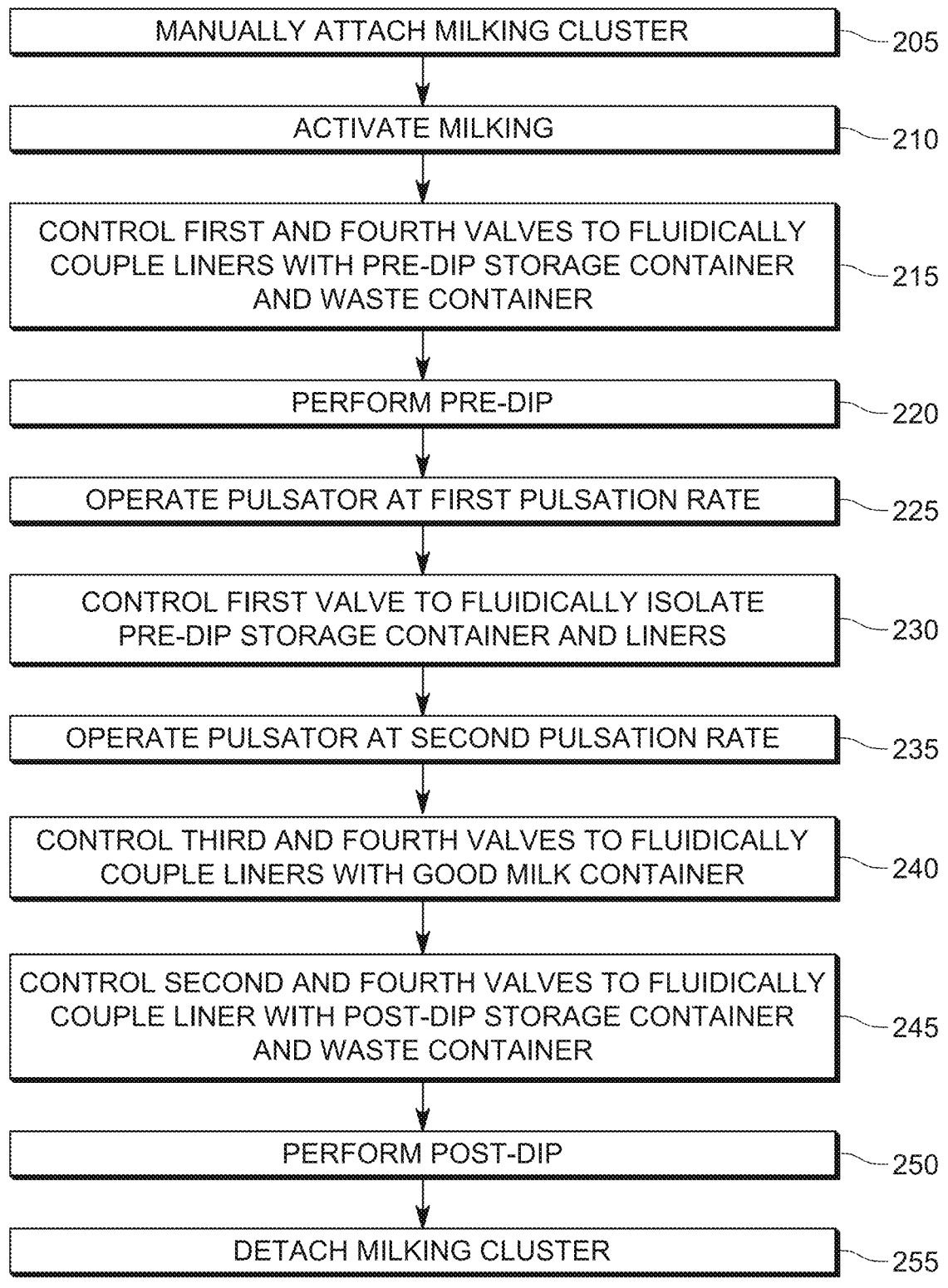

MANUALLY ATTACH MILKING CLUSTER ⎯ 205

ACTIVATE MILKING ⎯ 210

CONTROL FIRST AND FOURTH VALVES TO FLUIDICALLY COUPLE LINERS WITH PRE-DIP STORAGE CONTAINER AND WASTE CONTAINER ⎯ 215

PERFORM PRE-DIP ⎯ 220

OPERATE PULSATOR AT FIRST PULSATION RATE ⎯ 225

CONTROL FIRST VALVE TO FLUIDICALLY ISOLATE PRE-DIP STORAGE CONTAINER AND LINERS ⎯ 230

OPERATE PULSATOR AT SECOND PULSATION RATE ⎯ 235

CONTROL THIRD AND FOURTH VALVES TO FLUIDICALLY COUPLE LINERS WITH GOOD MILK CONTAINER ⎯ 240

CONTROL SECOND AND FOURTH VALVES TO FLUIDICALLY COUPLE LINER WITH POST-DIP STORAGE CONTAINER AND WASTE CONTAINER ⎯ 245

PERFORM POST-DIP ⎯ 250

DETACH MILKING CLUSTER ⎯ 255

FIG. 2

Open liner

Closed liner 916
916

MILKING SYSTEM AND METHODS WITH PRE- AND POST-DIP IN THE TEAT LINER

CROSS-REFERENCE TO RELATED APPLICATIONS

This application claims priority under 35 U.S.C. § 119 to U.S. Provisional Application No. 63/239,214, filed on Aug. 31, 2021, the entire content of which is herein expressly incorporated by reference.

BACKGROUND

Commercial systems for milking dairy animals are generally divided between manual milking systems and automated milking systems. Automated milking systems, such as the one disclosed in U.S. Pat. No. 9,763,421, automatically attach the milking cluster to the teats of the dairy animal, automatically apply pre-dip to the teats, automatically milk the dairy animal, automatically apply post-dip to the teats of the dairy animal, and automatically detach the milking cluster from the teats of the diary animal. In contrast, manual milking systems require manually applying pre-dip to the teats, manually attaching the milking cluster to the teats, and then manually applying post-dip to the teats after milking.

Automated milking systems are significantly more expensive than manual milking systems due to the additional equipment required for the automated operation, including a robotic arm for moving the milking cluster to and from the teats (and attaching to and detaching from the teats) and sensors and a processor for identifying the position of each of the teats so that the teat cups can be automatically attached to each of the teats. In many cases automated milking systems are able to perform the milking process, including the pre- and post-dip application, quicker than a manual milking system. Thus, the higher up-front costs are considered to be offset by the more efficient milking process.

Manual milking parlors typically have milking stalls arranged in a line (or two parallel lines, i.e., a parallel line parlor), in a herringbone pattern (i.e., a herringbone parlor), or in a circle (i.e., rotatory parlors). The space in each milking stall in these configurations is typically dimensioned to provide minimal lateral space between the dairy animal and the separators between adjacent stalls. The stalls in manual milking parlors accordingly do not have the necessary space to allow retrofitting the stalls for an automated milking system.

Thus, installing an automated milking system requires reconfiguration of the milking parlor, which further increases the up-front costs of deploying an automated milking system.

It would be desirable to increase the efficiency of manual milking parlors without requiring that the milking stalls be reconfigured and without the high costs of the additional equipment required for automatic attachment and detachment of the milking clusters to and from the teats of the dairy animals.

SUMMARY

According to embodiments, there is a dairy animal milking system, which includes a good milk container, a bad milk container, a pre-dip storage container, a post-dip storage container a milking stall configured to accommodate a dairy animal for milking. The milking stall includes a milking cluster comprising a plurality of teat cups, a liner arranged at least partially in each of the plurality of teat cups, and a pulsation chamber arranged between each of the plurality of teat cups and the liner at least partially arranged therein. A support is affixed to one of the sides of the milking stall and configured for detachment of the milking cluster from the one of the sides of the milking stall. A first fluid line fluidically couples, via at least one first valve, an interior of each of the plurality of liners to the pre-dip storage container and fluidically couples, via at least one second valve 119, the interior of each of the plurality of liners to the post-dip storage container. A second fluid line fluidically couples, via at least one third valve, a downstream end of each of the plurality of liners with the good milk container and fluidically couples, via at least one fourth valve, the downstream end of each of the plurality of liners with the bad milk container. A pulsator is fluidically coupled with the pulsation chamber between each of the plurality of teat cups the liners arranged at least partially therein. The milking stall also includes a switch and a processor coupled to the at least one first valve, the at least one second valve, the at least one third valve, the at least one fourth valve, the pulsator, and the switch. Responsive to activation of the switch the processor is configured to control the at least one first valve to fluidically couple the pre-dip storage container with an interior of each of the plurality liners and control the at least one fourth valve to fluidically couple the bad milk container with the downstream end of each of the plurality liners. The processor is also configured to control the pulsator to apply a first pulsation rate to the pulsation chamber between each of the plurality of teat cups the liners arranged at least partially therein while the pre-dip is being supplied. The processor is further configured to control the at least one first valve to isolate the pre-dip storage container from the interior of each of the plurality of liners. The processor is also configured to control the pulsator to apply a second pulsation rate to the pulsation chamber between each of the plurality of teat cups the liners arranged at least partially therein. The processor is further configured to control the at least one third valve to fluidically couple the downstream end of each of the plurality of liners with the good milk container. The processor is also configured to control the at least one second valve to fluidically couple the post-dip storage container with the interior of each of the plurality of liners, control the at least one third valve to fluidically isolate the good milk container from the downstream end of each of the plurality of liners, and control the at least one fourth valve to fluidically couple the bad milk container to the downstream end of each of the plurality of liners.

According to embodiments, there is a method for milking a diary animal. A milking cluster is manually attached to the dairy animal by manually inserting each of a plurality of teats of the dairy animal into a corresponding one of a plurality of teat cups. Each of the plurality of teat cups includes a corresponding liner at least partially disposed within the teat cup. A milking of the dairy animal with the manually attached milking cluster is activated. The milking of the dairy animal involves controlling at least one first valve to fluidically couple a pre-dip storage container with an interior of each of the plurality of liners and controlling at least one fourth valve to fluidically couple a bad milk container with the downstream end of each of the plurality of liners. A pre-dip application is performed on each of the plurality of teats by supplying pre-dip to the interior of each of the plurality liners. A pulsator is operated at a first pulsation rate to a pulsation chamber arranged between each of the teat cups and each of the corresponding liners and directing the pre-dip to a waste milk line. The at least one first valve is controlled to isolate the pre-dip storage container from the interior of each of the plurality of liners. The pulsator is operated at a second pulsation rate to the pulsation chamber to draw milk from each of the plurality of teats. The at least one third valve is controlled to fluidically couple the downstream end of each of the plurality of liners with a good milk container so that milk from the dairy animal is provided to the good milk container. At least one second valve is controlled to fluidically couple a post-dip storage container with the interior of each of the plurality of liners, at least one third valve is controlled to fluidically isolate the good milk container from the downstream end of each of the plurality of liners, and the at least one fourth valve is controlled to fluidically couple the bad milk container to the downstream end of each of the plurality of liners. After drawing milk from each of the plurality of teats, a post-dip application is performed on each of the plurality of teats by supplying post-dip the interior of each of the plurality liners. The milking cluster is then detached by removing each of the plurality of teats from the corresponding one of the plurality of teat cups.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a flow diagram of a method for a milking system according to embodiments;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of milking systems for dairy animals.

Figure 1A:
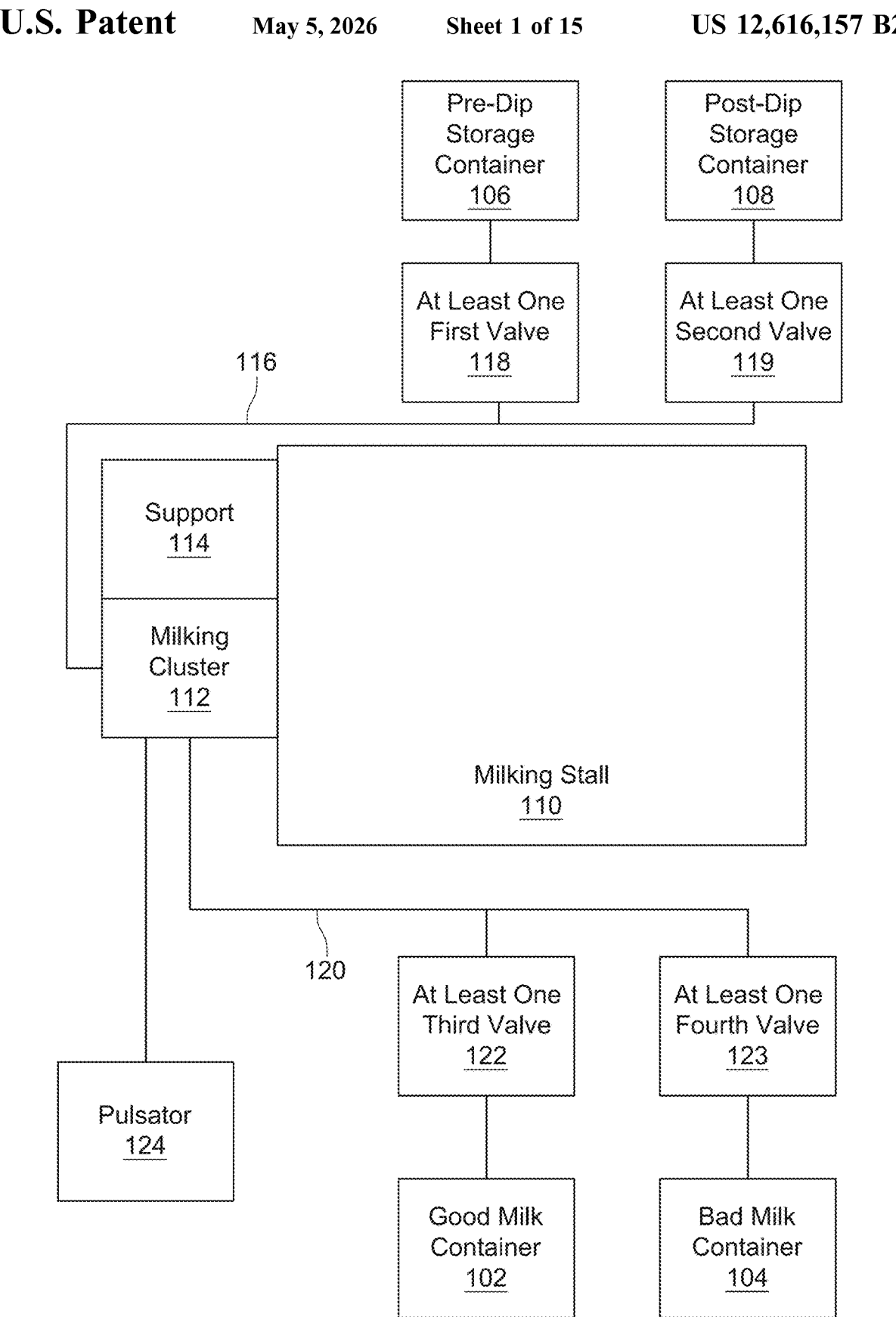
FIGS. 1A and 1B are schematic diagrams of a milking system according to embodiments.
Figure 1B:
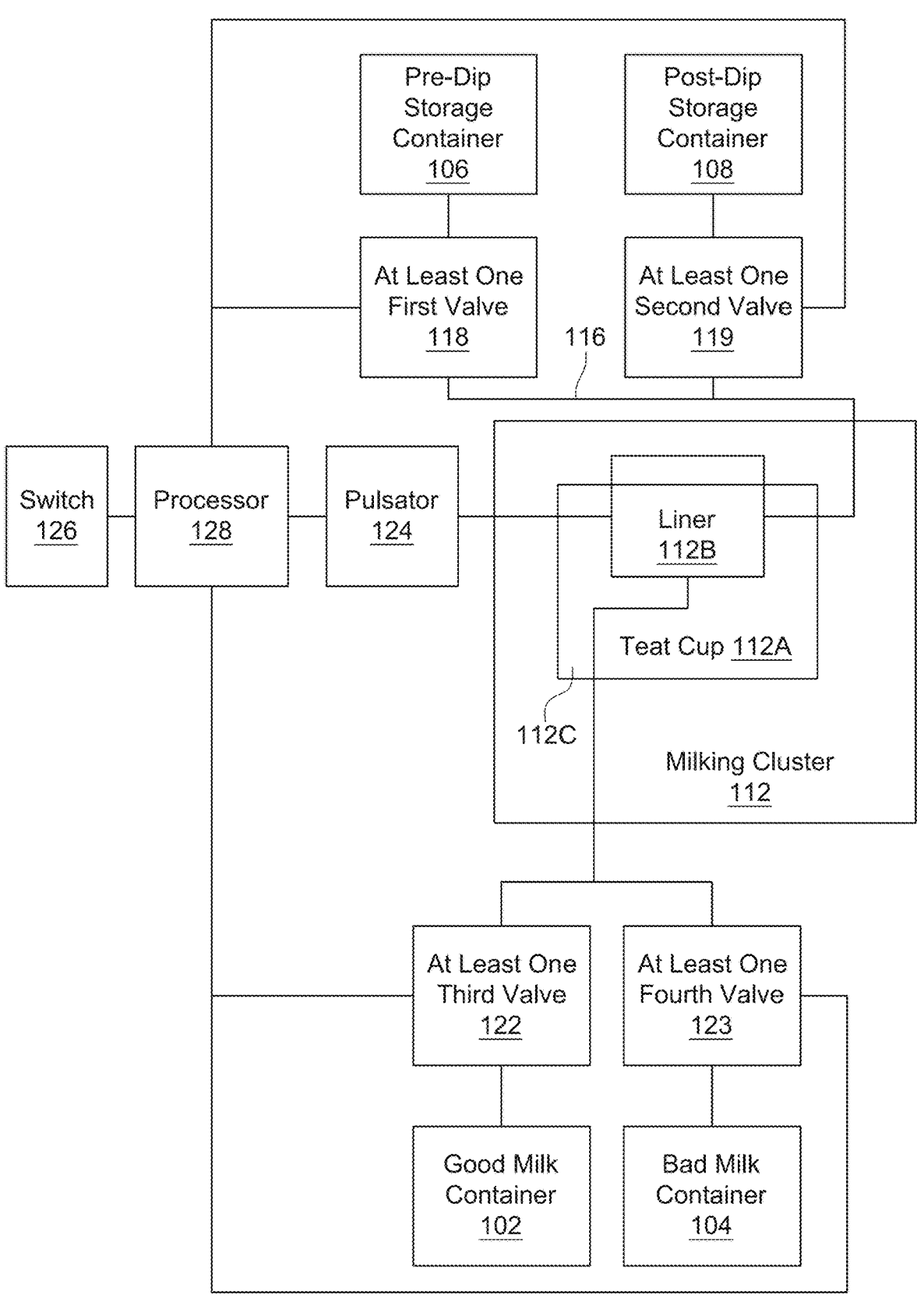

FIGS. 1A and 1B are schematic diagrams of a milking system according to embodiments. The diary animal milking system includes a good milk container 102, a bad milk container 104, a pre-dip storage container 106, a post-dip storage container 108, and a milking stall 110 configured to accommodate a dairy animal for milking. The good milk container 102 contains milk obtained from the milked dairy animals that will be sold, whereas the waster container 104 includes bad milk, foremilk, pre- and post-dip chemicals, water, and debris dislodged from the dairy animal's teat during the pre-dip process. The pre-dip storage container 106 includes chemicals used to clean the dairy animal's teats prior to milking and the post-dip storage container 108 includes chemicals used to treat the dairy animal's teats after milking. The milking stall 110 can be one of a number of adjacent milking stalls arranged in a parallel line, rotary, or herringbone configuration. As will be appreciated by the discussion below in connection with FIGS. 3-9B, the milking system can also include air and water lines used during the pre- and post-dip processes.

The milking stall 110 includes a milking cluster 112 having a plurality of teat cups 112A, a liner 112B arranged at least partially in each of the plurality of teat cups 112A, and a pulsation chamber 112C arranged between each of the plurality of teat cups 112A and the liner 112B at least partially arranged therein. When the dairy animal is a cow, the plurality of teat cups and plurality of liners will be four, corresponding to the four teats of a cow. If the milking system is used for other types of dairy animals, the number of the plurality of teat cups and liners will be different.

The milking stall 110 also includes a support 114 affixed to one of the sides of the milking stall 110 and configured for detachment of the milking cluster 112 from the one of the sides of the milking stall 110. Depending upon implementation, the milking cluster 112 can be detached manually, in a partially automated manner, or a fully automated manner. In a rotary parlor and a line parlor the dairy animals are arranged in the stall with the rear of the dairy animals facing a partially closed side of the stall and the support 114 is affixed to this partially closed side of the milking stall 110. In a herringbone parlor, the dairy animals the milking cluster is affixed to the dairy animal from a lateral side of the dairy animal, and in this arrangement the support 114 is affixed a partially closed side of the milking stall 110 that is on a lateral side of the diary animal.

The milking stall 110 further includes a first fluid line 116 fluidically coupling 116, via at least one first valve 118, an interior of each of the plurality of liners 112B to the pre-dip storage container 106. First fluid line 116 is fluidically coupled, via at least one second valve 119, to the post-dip storage container 108. The milking stall 110 also includes a second fluid line 120 fluidically coupling, via at least one third valve 122, a downstream end of each of the plurality of liners 112B with the good milk container 102. The second fluid line 120 also fluidically couples, via at least one fourth valve 123, a downstream end of each of the plurality of liners 112B with the bad milk container 104.

The milking system 110 further includes a pulsator 124 fluidically coupled with the pulsation chamber 112C between each of the plurality of teat cups 112A the liners 112B arranged at least partially therein, and a switch 126. The milking system also includes a processor 128 coupled to the at least one first valve 118, the at least one second valve 119, the at least one third valve 122, the at least one fourth valve 123, the pulsator 124, and the switch 126. The processor 128 can be a microprocessor, programmable logic controller (PLC), an application specific integrated circuit (ASIC), and/or field programmable gate array.

Responsive to activation of the switch 126, the processor 128 is configured to control the milking system to perform the pre-dip application, the milking, and the post-dip application while the teats are in the liners 112B. The switch 126 is actuated prior to manually attaching the milking cluster 112 to the dairy animal. Specifically, actuation of the switch causes vacuum to be applied to pulsation chamber 112C arranged between each of the plurality of teat cups 112A and the liner 112B at least partially arranged therein, and then once it is detected that all of the dairy animal's teats have been inserted into a respective liner 112B, the processor 128 begins the milking process, which includes applying pre-dip, milking, and applying post-dip while the teats are within the liners 112B.

The processor 128 is configured to control the at least one first valve 118 to fluidically couple the pre-dip storage container 106 with an interior of each of the plurality of liners 112B and control the at least one fourth valve 123 to fluidically couple the bad milk container 104 with the interior of each of the plurality of liners 112B. The at least one third valve 122 should already be in a closed state, however if it is not, this step also includes closing the at least one third valve 122 to prevent pre-dip and any debris from entering the good milk storage container 102. The fluidic coupling between the pre-dip storage container 106 and the interior of the liners 112B can be from a downstream end of the liners 112B, an upstream end of the liners 112B, or between the upstream and downstream ends of the liners 112B. The processor 128 is also configured to control the pulsator 124 to apply a first pulsation rate to the pulsation chamber 112C between each of the plurality of teat cups 112A the liners 112B arranged at least partially therein while the pre-dip is being supplied.

The processor 128 is further configured to control the at least one first valve 118 to isolate the pre-dip storage container 106 from the interior of each of the plurality of liners 112B. The processor 128 is also configured to control the pulsator 124 to apply a second pulsation rate to the pulsation chamber 112C between each of the plurality of teat cups 112A the liners 112B arranged at least partially therein.

The processor 128 is also configured to control the at least one third valve 122 and at least one fourth valve 123 to fluidically couple the downstream end of each of the plurality of liners 112B with the good milk container 102 and to fluidically isolate the downstream end of each of the plurality of liners 112B from the bad milk container 104. The processor 128 is further configured to control the at least one second valve 119 to fluidically couple the post-dip storage container 108 with the interior of each of the plurality of liners 112B and control the at least one fourth valve 123 to fluidically couple the bad milk container 104 to the interior of each of the plurality of liners 112B and control the at least one third valve 122 to fluidically isolate the downstream end of each of the plurality of liners 112B from the good milk container 102. The fluidic coupling of the post-dip storage container 108 with the interior of the liners 112B can be from a downstream end of the liners 112B, an upstream end of the liners 112B, or between the downstream and upstream ends of the liners 112B.

The configuration of the processor 128 in the manner described above can, depending upon the specific type of processor employed, be performed based solely on hardware or based on a combination of hardware and software.

An exemplary method for operating a milking system will now be described in connection with FIGS. 1A, 1B, and 2. Initially, a milking cluster 112 is manually attached to the dairy animal by manually inserting each of a plurality of teats of the dairy animal into a corresponding one of a plurality of teat cups 112A (step 205). Each of the plurality of teat cups 112A includes a corresponding liner 112B at least partially disposed within the teat cup 112A. A milking of the dairy animal with the manually attached milking cluster 112 is then activated (step 210). The milking of the dairy animal involves steps 215-250.

At least one first valve 118 is controlled, by the processor 128, to fluidically couple a pre-dip storage container 106 with an interior of each of the plurality of liners 112B and at least one fourth valve 123 is controlled, by the processor 128, to fluidically couple a bad milk container 104 with a downstream end of each of the plurality of liners 112B (step 215). A pre-dip application is performed on each of the plurality of teats by supplying pre-dip to the interior of each of the plurality liners 112B (step 220). The processor 128 can control the supply of the pre-dip.

A pulsator 124 is operated at a first pulsation rate to a pulsation chamber 112C arranged between each of the teat cups 112A and each of the corresponding liners 112B and directing the pre-dip to a waste milk line (step 225).

The at least one first valve 118 is controlled by the processor 128 to isolate the pre-dip storage container 106 from the interior of each of the plurality of liners 112B (step 230). The pulsator 124 is then operated at a second pulsation rate to the pulsation chamber 112C to draw milk from each of the plurality of teats (step 235). The processor controls at least one third valve 122 to fluidically couple the downstream end of each of the plurality of liners 112B with a good milk container 102 so that milk from the dairy animal is provided to the good milk container 102 (step 240). After drawing milk, the processor then controls the at least one second valve 119 to fluidically couple a post-dip storage container 108 with the interior of each of the plurality of liners 112B, controls the at least one third valve 122 to fluidically isolate the good milk container 102 from the downstream end of each of the plurality of liners 112B, and controls the at least one fourth valve 123 to fluidically couple the bad milk container 104 to the downstream end of each of the plurality of liners 112B (step 245).

After drawing milk from each of the plurality of teats, a post-dip application on each of the plurality of teats by supplying post-dip to the interior of each of the plurality liners 112B (step 250). The supply of post-dip can be controlled by the processor 128.

Once the milking process, including the post-dipping of the teats, is completed, the milking cluster 112 is detached by removing each of the plurality of teats from the corresponding one of the plurality of teat cups 112A (step 255). The detachment of the milking cluster 112 from the plurality of teats can occur due to the release of the vacuum acting on the liners of the teat cups, which causes the milking cluster to detach from the teats.

The system and method described above can be implemented in a number of different ways, for example due to due to different governmental regulations. A non-limiting implementation will now be described in connection with FIGS. 3A-9B.

Figure 3A:
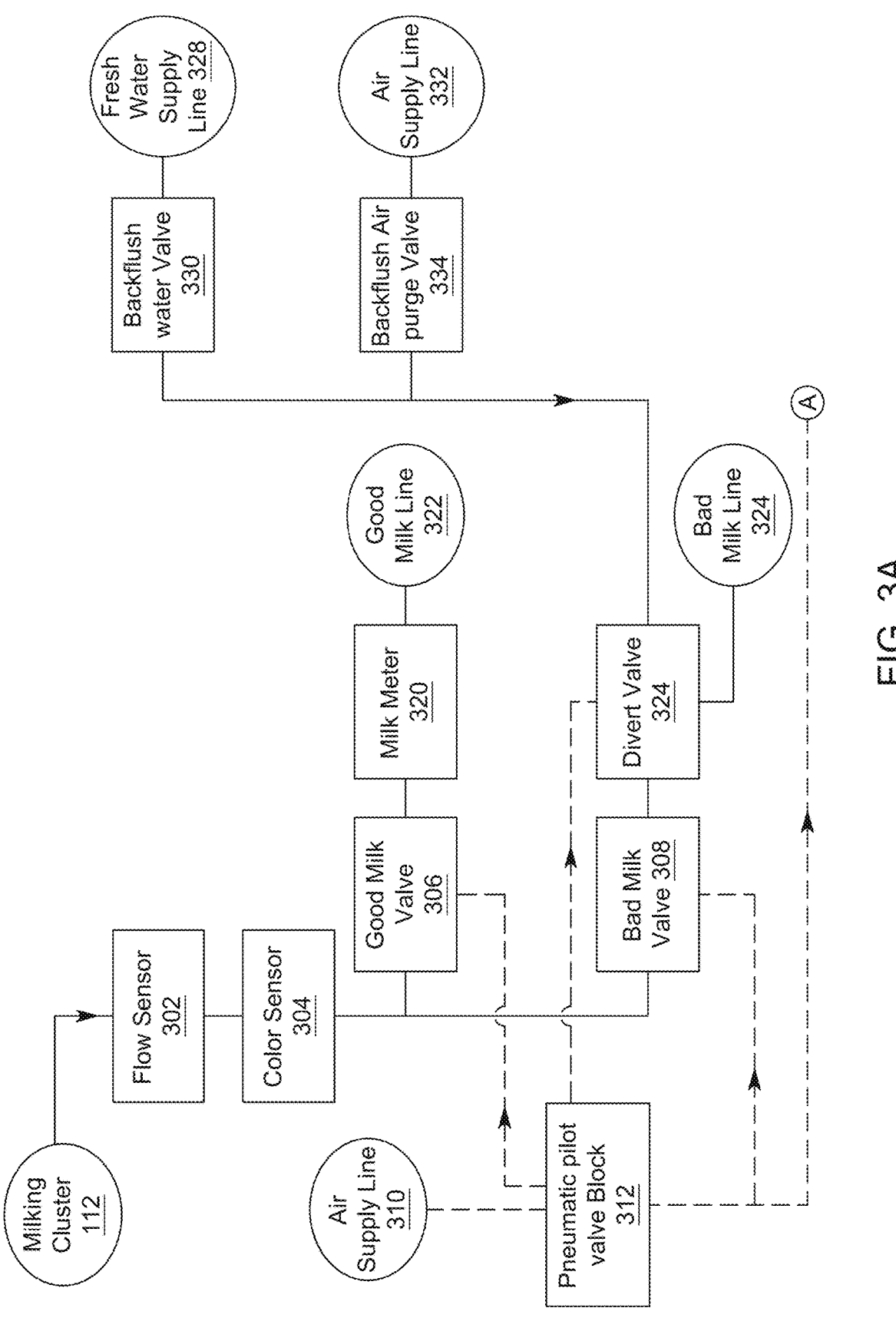
FIGS. 3A and 3B are detailed schematic diagrams of one exemplary implementation of the milking system illustrated in FIGS. 1A and 1B according to embodiments.
Figure 3B:
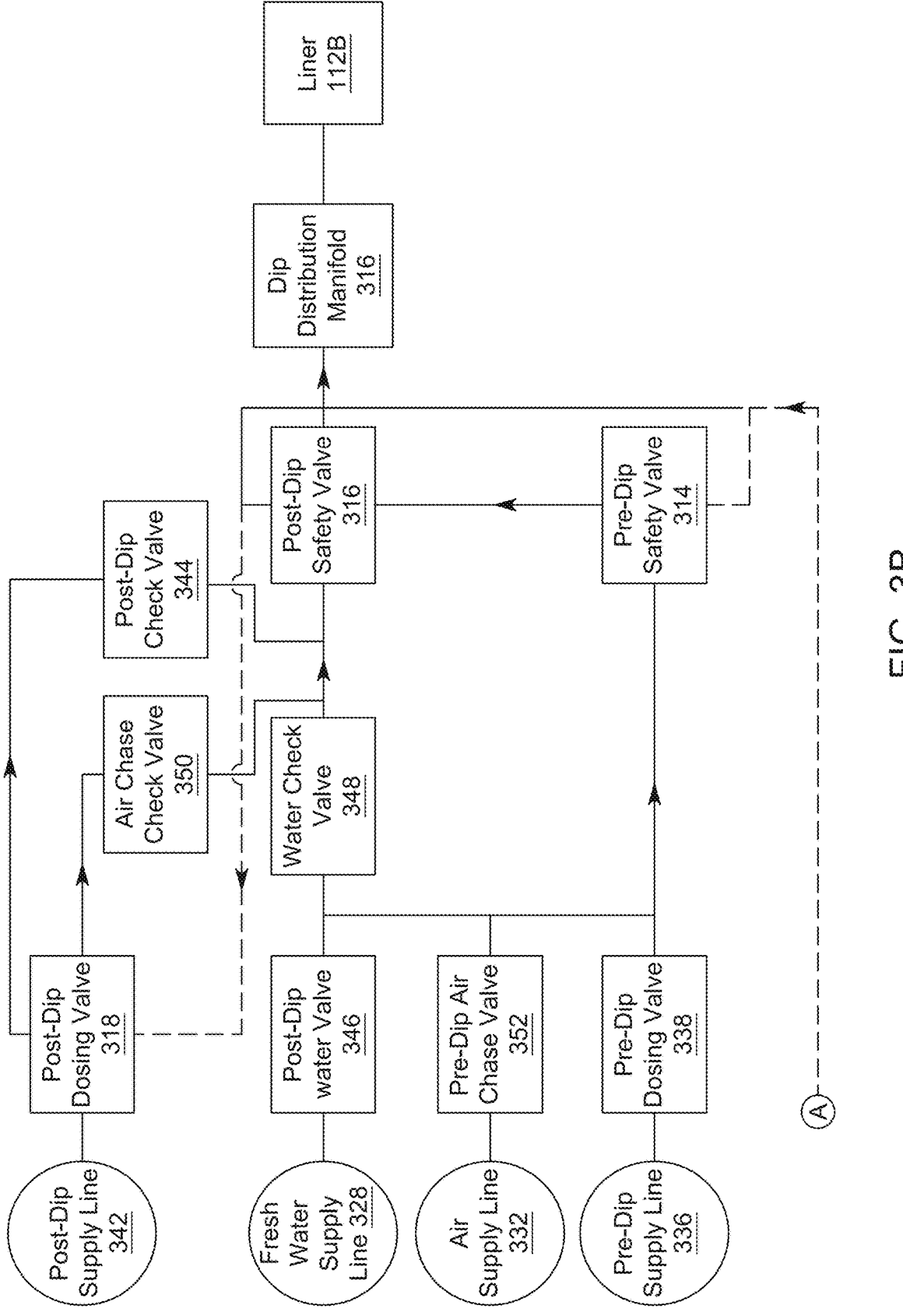

The arrows in FIGS. 3A and 3B illustrate the direction of fluid flow. For ease of illustration, the fresh water supply line 328 and air supply line 332 are illustrated separately in both FIGS. 3A and 3B, however it will be recognized that the fresh water supply line 328 in FIGS. 3A and 3B are the same line and the air supply line 332 in FIGS. 3A and 3B are the same supply lines.

FIG. 3A illustrates the flow of milk and other fluids originating from the liners 112B in which the dairy animal's udders are placed and FIG. 3B illustrates the flow of fluids, i.e., pre-dip, post-dip, water, and air, for the pre-dip and post-dip processes. Thus, although FIGS. 3A and 3B separately illustrate the milking cluster 112 and the liner 112B, it will be recognized that the liner 112B is inserted in the teat cups 112A of the milking cluster 112.

Turning to first to FIG. 3A, the milking cluster 112 is connected to a line that includes a flow sensor 302 and then a color sensor 304. These sensors can also be arranged in the opposite order, and further the flow sensor 302 may be omitted, if desired. The line is then connected to a good milk valve 306 and a bad milk valve 308, which are both used to control whether the fluid and other material in the line is fluidically coupled to the good milk container 102 or the bad milk container 104. Accordingly, when the good milk valve 306 is open the bad milk valve 308 is closed, and vice-versa.

An air supply line 310 is coupled to the good milk valve 306 and the bad milk valve 308 via a pneumatic pilot valve block 312, which is comprised of an arrangement of more than one valve. As illustrated in FIG. 3B, the air supply line 310 is coupled, via the pneumatic pilot valve 312, to a pre-dip safety valve 314, a post-dip safety valve 316, and a post-dip dosing valve 318.

Returning to FIG. 3A, when the good milk valve 306 is open and the bad milk valve 308 is closed, the fluid from the milking cluster 112, which in this case is milk, is passed through a milk meter 320 to measure the amount of milk, and then is passed to the good milk line 322, which is fluidically coupled to the good milk container 102. When the bad milk valve 308 is open and the good milk valve 306 is closed, the fluid and any material in the fluid is passed to a divert valve 324, which provides the fluid and any material in the fluid to the bad milk line 326, which is fluidically coupled to the bad milk container 104.

The divert valve 324 couples water supply line 328, via backflush water valve 330, to the milking cluster 112 and couples air supply line 332, via backflush air purge valve 334, to the milking cluster 112. Thus, water and air can be supplied to the milking cluster 112 to remove the bad milk, foremilk, and any debris contained therein from the lines prior to supplying the good milk through these lines, which prevents the bad milk, foremilk, and debris from contaminating the good milk.

Turning again to FIG. 3B, a pre-dip supply line 336, which is coupled to pre-dip storage container 106, supplies pre-dip to the liner 112B via pre-dip dosing valve 338, pre-dip safety valve 314, and the dip distribution manifold 340. This allows the pre-dip to be provided to the liners 112B containing the dairy animal's udders for the pre-dip process. A post-dip supply line 342, which is coupled to post-dip storage container 108, supplies post-dip to the liner 112B via post-dip dosing valve 318, post-dip check valve 344, and dip distribution manifold 340.

The water supply line 328 and air supply line 332 are used to flush parts of the milking system following the supply of post-dip to the dairy animal's teats. Specifically, the fresh water supply line is coupled to a post-dip water valve 346, which controls whether or not the water is fluidically coupled to the rest of the system, and a water check valve 348, which prevents a backflow of any liquids to the fresh water supply line 328. The water passing water check valve 348 passes through the post-dip safety valve 316 to wash the dip distribution manifold 340 and the liners 112B. The air supply line 332 is likewise coupled to the dip distribution manifold 340 and liners 112B via the pre-dip air chase valve 352, water check valve 348, and post-dip safety valve 316. Pre-dip chase valve 352 is configured to push pre-dip to the teats in the liners 112B and push water to the teat cups 112A during a backflush disinfection process. Valve 350 is configured to allow to push the post-dip to the teats in the liners 112B at the end of milking but also to prevent water and post-dip from flowing backwards into the system. Further, the water supply line 328 and air supply line 332 can be coupled to the teat cups 112A to wash and dry the dairy animal's udders during the pre-dip and post-dip processes. Specifically, after applying the pre-dip or post-dip chemicals, water can be applied to the udders to wash off any remaining chemicals (or other debris and foremilk in the case of the pre-dip process) and air can be supplied to the udders to dry them.

Referring now to FIGS. 1A, 1B, and 3A, from the discussion above it will be appreciated that the at least one third valve 122 coupling the liners 112B to the good milk container 102 includes the good milk valve 306 and the at least one fourth valve 123 coupling the liners 112B to the bad milk container 104 includes bad milk valve 308 and divert valve 324.

Referring now to FIGS. 1A, 1B, and 3B, from the discussion above it will be appreciated that the at least one first valve 118 includes pre-dip dosing valve 338 and pre-dip safety valve 314, and that the at least one second valve 119 includes the post-dip dosing valve 318, the post-dip check valve 344, and the post-dip safety valve 316. As noted above, the arrangement of valves can vary depending upon the governmental regulations that apply in the geographic location in which the milking system is installed.

Figure 4A:
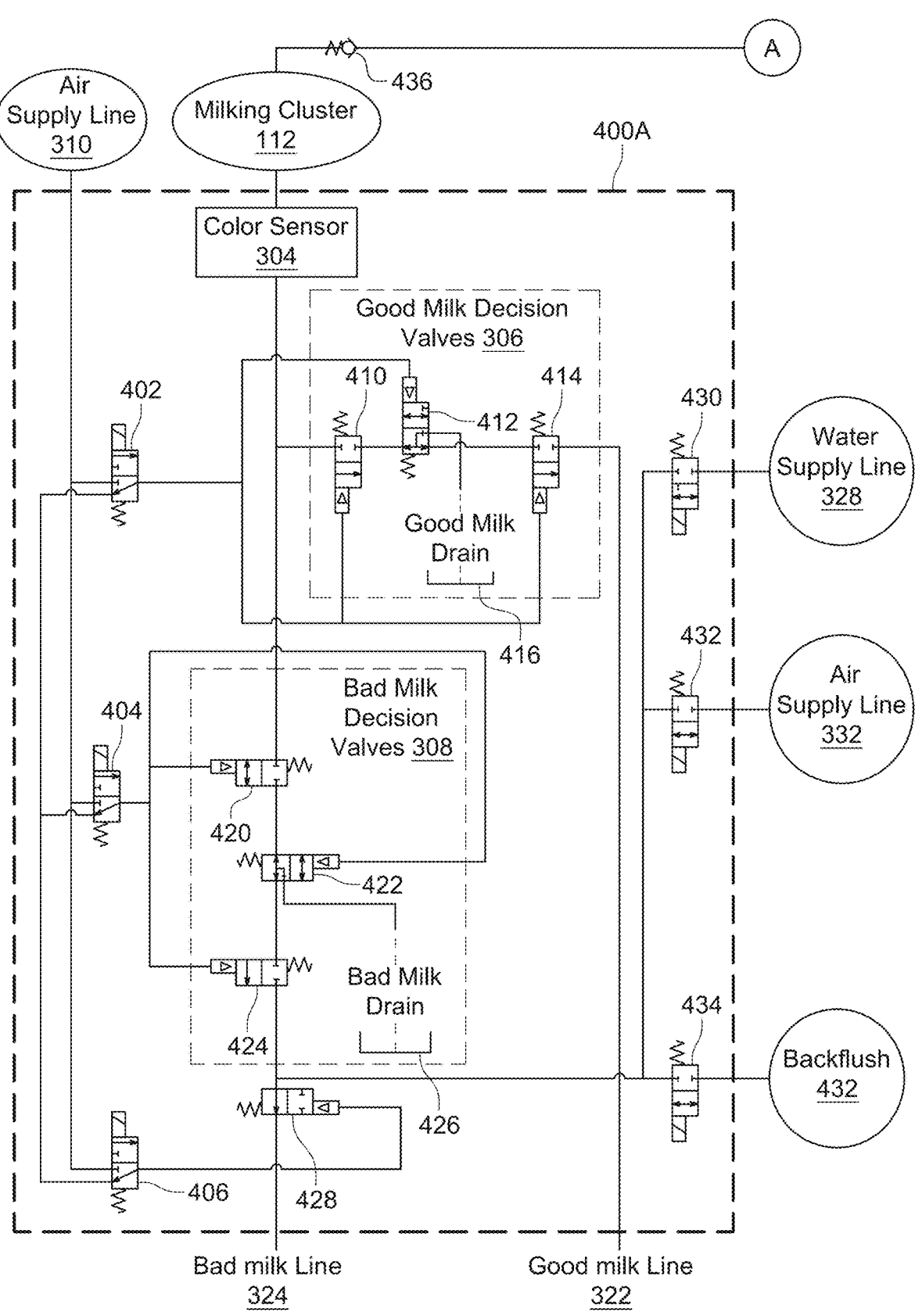
FIGS. 4A and 4B are schematic diagrams of the arrangement of valves in different panels of the milking system according to embodiments.
Figure 4B:
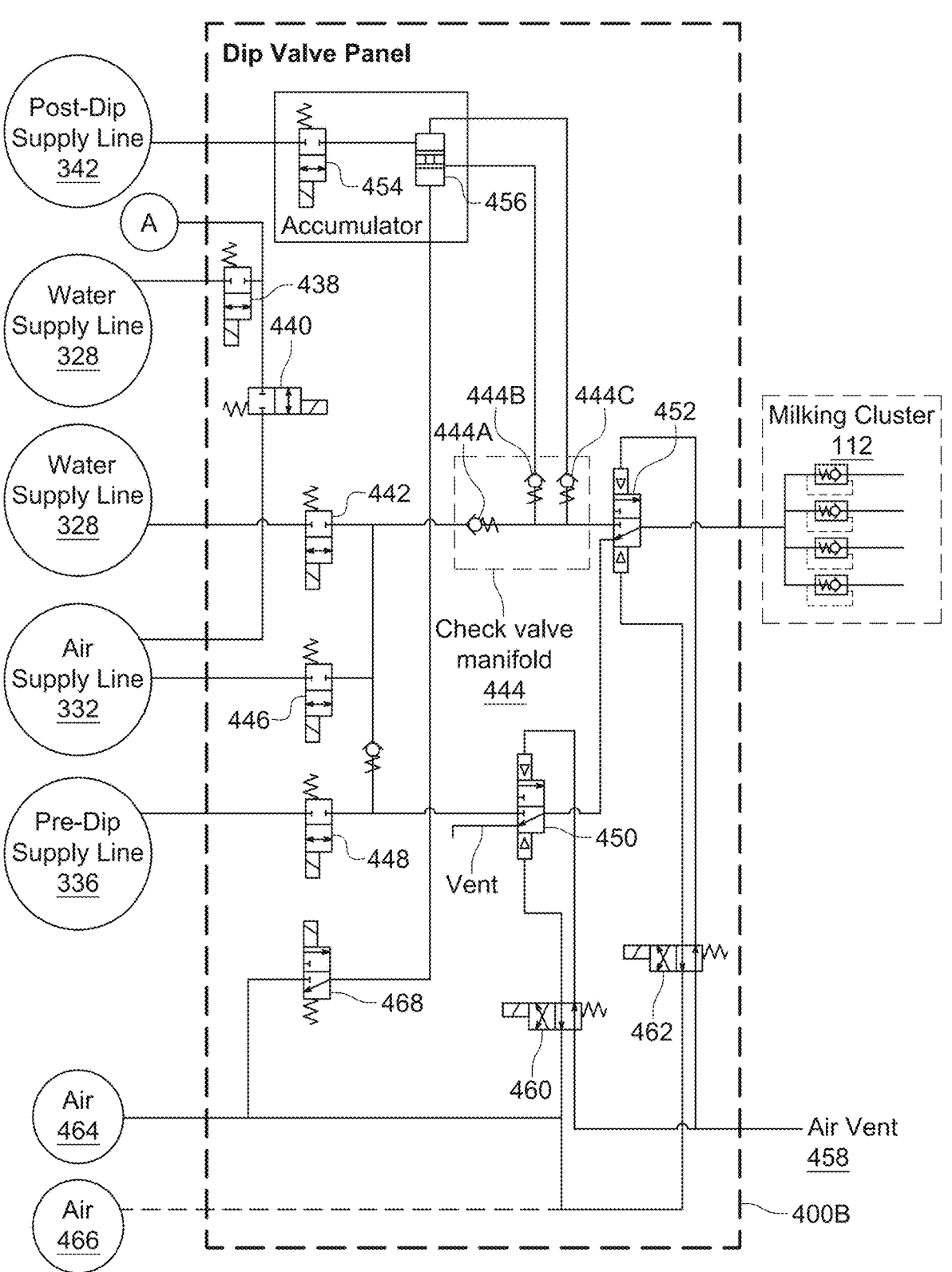

The disclosed milking system is intended for installation in existing milking parlors, and accordingly must conform with the limited existing space requirements. Therefore, as illustrated in FIGS. 4A and 4B, the valves for controlling milk flow from the liners of the teat cups can be arranged on one panel (400A in FIG. 4A) and the valves for controlling the flow of fluids to and from the liners of the teat cups in connection with the pre- and post-dip processes can be arranged in a separate panel (400B in FIG. 4B). For ease of illustration, the fresh water supply line 328 and air supply line 332 are illustrated separately in both FIGS. 4A and 4B, however it will be recognized that the fresh water supply line 328 in FIGS. 4A and 4B are the same line and the air supply line 332 in FIGS. 3A and 3B are the same supply lines.

As illustrated in FIG. 4A, the milk decision valve and backflush panel 400A (referred hereinafter as the milk panel), includes the air supply line 310 coupled to three two position/three way valves 402-406, which correspond to the pneumatic pilot valve block 312. Valve 402 couples the air supply line 310 to the good milk valve 306, valve 404 couples the air supply line 310 to the bad milk valve 308, and valve 406 couples the air supply line 310 to valve 428, which is coupled between the bad milk valve 308 and the bad milk line 324. Valve 428 corresponds to divert valve 324. In the specific example illustrated in FIGS. 4A and 4B, the good milk valve 306 and bad milk valve 308 are block-bleed-block valves, which is required in the United States. When implemented outside of the United States, these valves need not have the block-bleed-block configuration.

The milking cluster 112 is coupled, via a color sensor 304, to the good milk valve 306 and the bad milk valve 308. It will be recognized that this connection is via the milk outlet of the liners and teat cups of the milking cluster, which is typically arranged at the downstream end of the liners and teat cups. When the pre-dip process is completed and the lines are cleaned, color sensor 304 can be used to determine whether or not the milk coming from the milking cluster 112 is good or bad milk and the good milk valve 306 and the bad milk valve 308 are controlled accordingly. When information from the color sensor indicates that good milk is flowing from the milking cluster 112, good milk decision valves 410-414 are open to allow the milk to travel into the good milk line 322 and the bad milk decision valves 420-424 are closed. During the pre-dip process, the post-dip process, and when information from the color sensor indicates that the milk coming from the milking cluster 112 is bad, the good milk decision valves 410-414 are closed and bad milk decision valves 420-424 are open to allow the chemicals from the pre-dip and post-dip, as well as bad milk, to be directed to the bad milk line 324. When the good milk valve 306 is open, the fluidic path to the good milk drain 416 is closed and the fluidic path is open when the good milk valve 306 is closed. Similarly, when the bad milk valve 308 is open, the fluidic path to the bad milk drain 426 is closed and the fluidic path is open when the bad milk valve 308 is closed.

Valve 430 couples the water supply line 328 to the milking cluster 112, valve 432 couples the air supply line 332 to the milking cluster 112, and valve 434 couples the backflush line 432 to the milking cluster 112. Valve 430 corresponds to backflush water valve 330 and valve 432 corresponds to backflush air purge valve 334. The fluid in the water supply line 328, air supply line 332, and backflush line 432, can be supplied to clean the milking cluster and the lines and valves between the milking cluster 112 and the good and bad milk lines 322 and 324 after milking a dairy animal to clean the milking cluster 112 and lines between the milking cluster 112 and the good and bad milk lines 322 and 324.

The milking cluster 112 is coupled, via check valve 436, to the dip panel 400B. Turning now to FIG. 4B, the check valve 436 is coupled to the water supply line 328 via valve 438 so that water can be supplied to the milking cluster 112 to rinse foremilk, debris, and pre-dip from the milking cluster 112 to the bad milk valve 308 prior to switching the flow path from the milking cluster from being directed to the bad milk line 324 to being directed to the good milk line 322. Check valve 436 is coupled to air supply line 332 via valve 440 so that air can be supplied to the milking cluster 112 in order to push water downstream of the bad milk valve 308 as part of a purge process prior to switching the valves so that a fluidic path is established from the miking cluster 112 to the good milk line 322.

The lines in the dip manifold can also be cleaned using water supply line 328 and air supply line 332. Specifically, the water supply line 328 is coupled to the lines in the dip manifold by a valve 442, which is coupled to a check valve manifold 444. The check valve manifold includes water check valve 444A (which corresponds to water check valve 348), air chase check valve 444B (which corresponds to air chase check valve 350), and valve 444C (which corresponds to post-dip check valve 344).

Valve 442 corresponds to post-dip water valve 346. Similarly, the air supply line 332 is coupled to the lines in the dip manifold by valve 446, which is also coupled to check valve manifold 444. Valve 468 corresponds to post-dip air chase valve 352. Check valve manifold 444 prevents air and post-dip chemical from passing back into the water supply line 328 and the air supply line 332.

The pre-dip supply line 336 is coupled to the dairy animal's teats in the milking cluster 112 via valves 448, 450, and 452, as well as a check valve coupled to each teat cup. Valve 448 corresponds to pre-dip dosing valve 338, valve 450 corresponds to pre-dip safety valve 314, and valve 452 corresponds to the post-dip safety valve 316. The post-dip supply line 342 is coupled to the dairy animal's teats in the milking cluster 112 via post-dip valve 454, accumulator 456, a check valve of the check valve manifold 444, valve 452, as well as a check valve coupled to each teat cup. Valve 454 corresponds to post-dip dosing valve 318. The pre-dip and post-dip can be supplied, for example, to an upstream end of the teat cups 112A and liners 112B, which connection is distinct from the downstream connection used for milk collection and for draining bad milk, foremilk, and other debris. The pre-dip and post-dip can alternatively be supplied to the downstream end of the teat cups 112A and liners 112B or between the upstream and downstream ends of the teat cups 112A and liners 112B.

An air vent 458 is coupled to valve 450 via valve 460 and to valve 452 via valve 462 to vent air so that the dip safety valve 450 can shift back and forth freely. Air lines 464 and 466 are coupled to valves 460, 462, and 468 so that air can be passed through the valves and lines of the dip panel to clear and dry the lines at the end of the pre-dip and post-dip processes. Valves 460, 462, and 468 form the valves of the pneumatic pilot valve block 312.

Figure 5A:
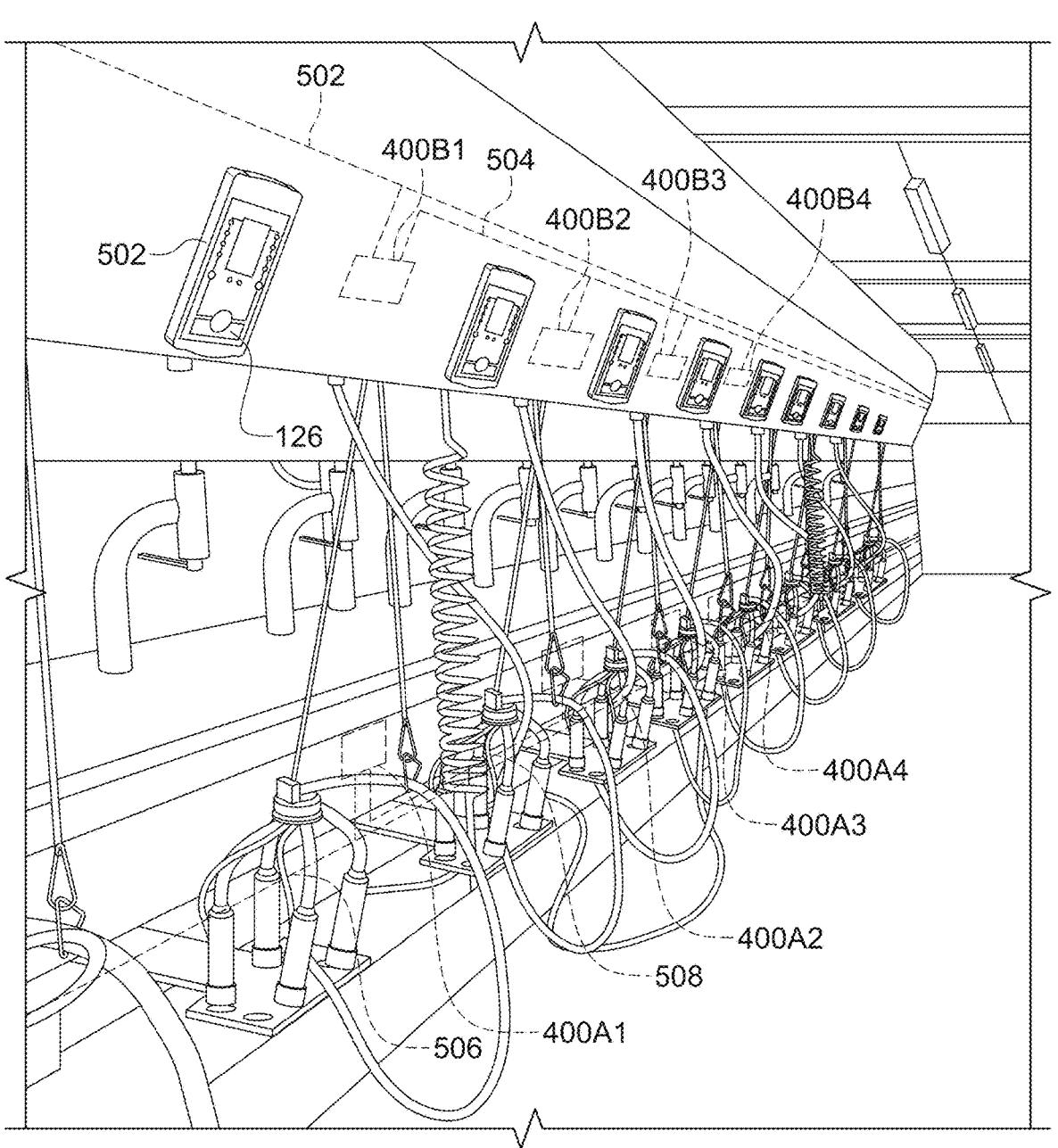
FIGS. 5A-5C respectively illustrate the arrangement of different panels for a parallel line parlor, a rotary parlor, and a herringbone parlor, according to embodiments.

Turning now to FIG. 5A, in a line parlor (only one half of a parallel line parlor being illustrated), the dip valve panel 400B can be installed in the upper housing and the milk valve panel 400A can be installed in the lower panel. If there is a subway below the line parlor, the milk valve panel 400A and the dip valve panel 400B can be installed in the subway below the portion of the milking parlor illustrated in FIG. 5A. There are a number of different ways for implementing the control of this arrangement. In one embodiment each valve panel 400A1-400A4 and 400B1-400B4 has a separate processor. In the illustrated embodiment, one of the dip panels 400B1 contains the processor, for example a PLC, that is communicatively coupled to three additional dip panels 400B2-400B4 to control the operation of valves of those panels. The PLC can be, for example, a 750-8101 Controller by Wago Corporation. These additional dip panels 400B2-400B4 each include, for example, an extender allowing communications between these additional dip panels 400B2-400B4 with the main dip panel 400B1. The extender can be, for example, a 750-628 bus extension coupler module by Wago Corporation. The main dip panel 400B1 is communicatively coupled, via communication line 502 (e.g., an Ethernet or RS-485 cable) to a computer (not illustrated) for controlling the milking system and collecting data from the milking system. Each of the additional dip panels 400B2-400B4 are coupled, via a communication line 504 (e.g., an Ethernet or RS-485 cable), to the main dip panel 400B1 for control of and data collection from each of the additional dip panels 400B2-400B4.

The milk valve panels 400A1-400A4 have a similar configuration to the dip panels 400B1-400B4. Specifically, a main milk panel 400A1 includes a processor, such as a BUS Coupler, that is communicatively coupled to three additional milk panels 400A2-400A4 to control the operation of the valves of those panels. The BUS Coupler can be, for example, a 750-362 fieldbus coupler by Wago Corporation. These additional milk panels 400A2-400A4 each include, for example, an extender allowing communications between these additional milk panels 400B2-400B4 with the main milk panel 400A1. The extender can be, for example, a 750-628 bus extension coupler module by Wago Corporation. The main milk panel 400A1 is communicatively coupled, via communication line 506 (e.g., an Ethernet or RS-485 cable) to a computer (not illustrated) for controlling the milking system and collecting data from the milking system. Each of the additional milk panels 400A2-400A4 are coupled, via a communication line 508 (e.g., an Ethernet or RS-485 cable), to the main milk panel 400A1 for control of and data collection from each of the additional milk panels 400A2-400A4.

Implementing these valve panels in this manner reduces overall costs because only one processor is required for four dip panels and one processor is required for four milk panels, instead of implementing a processor in each dip panel and each milk panel.

Although this non-limiting embodiment includes one main dip panel controlling three additional dip panels and one main milk panel controlling three additional milk panels, the main dip panel can control more or fewer than three dip panels and the main milk panel can control more or fewer than three milk panels.

Also illustrated in FIG. 5A, each milking stall includes a control panel 510 having a switch 126 used to activate a milking cycle. Specifically, before the teat cups are manually attached to the dairy animal's teats, the operator actuates switch 126, which turns on vacuum. After manually attaching the teat cups to the dairy animal's teats, the pre-dip process, milking process, and post-dip process are performed automatically, and while the teats are within the teat cups. Accordingly, control panel 502 is communicatively coupled with the milk panel 400A1 and dip panel 400B1 so that the valves in these panels are controlled to supply dip before and after the milking process and to block supply of dip during the milking process. Milk panel 400A1 and dip panel 400B2 are respectively coupled to the associated control panel (not labeled) for that milking position, and the other additional milk and dip panels are similarly configured. In this implementation the processor 128 controls the control panel 502, as well as the dip panel and milk panel.

Figure 5B:
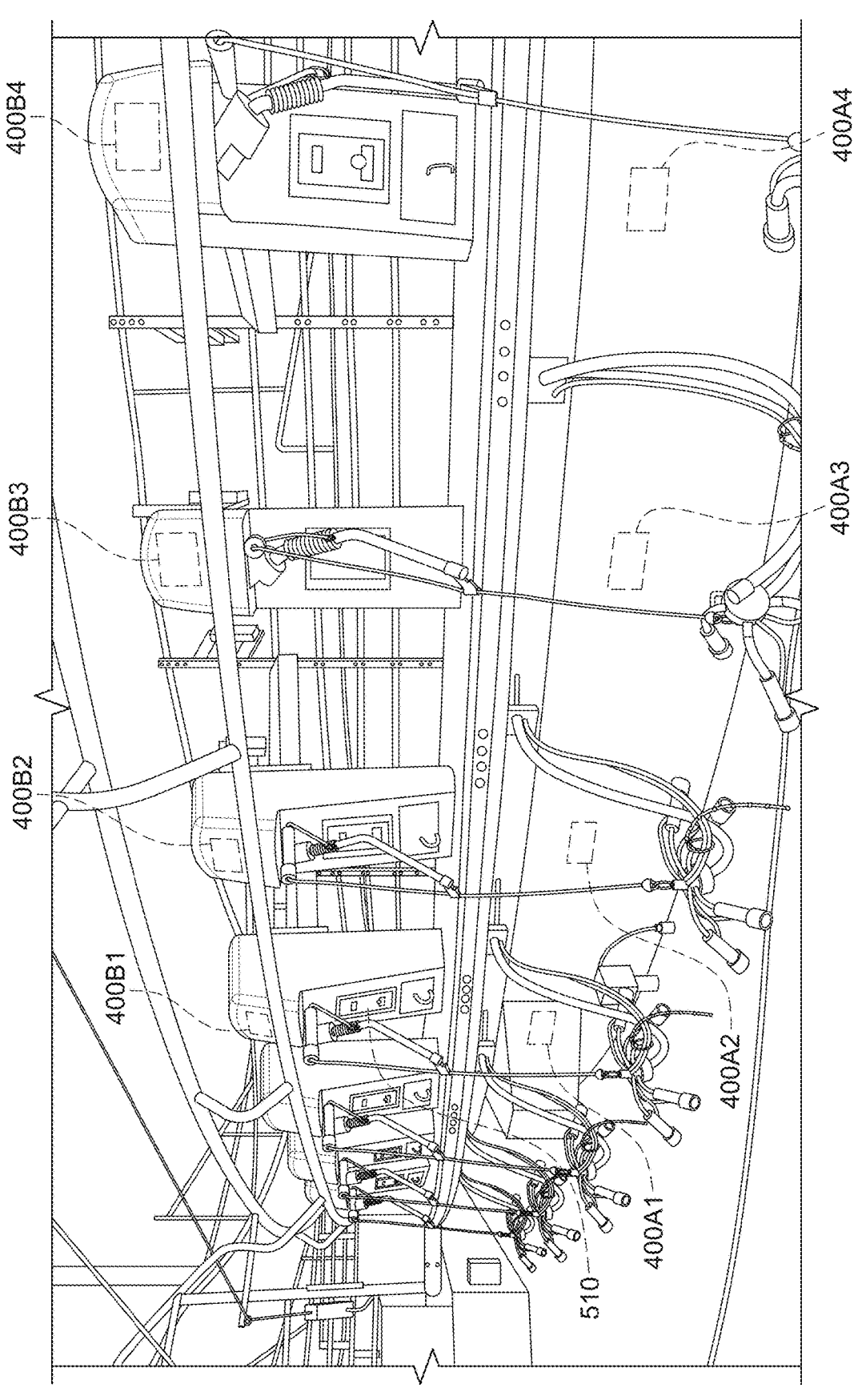

Turning now to FIG. 5B, a rotary parlor can include the milk panels 400A1-400A4 and the dip panels 400B1-400B4 communicatively coupled in a similar manner to that described above in connection with the line parlor, and accordingly the communication lines between panels is not illustrated for purposes of clarity. The dip panels 400B1-400B4 can be installed in the housing holding the existing control panel 510 and switch 126, and the milk panels 400A1-400A4 can be installed inside of the lower panel of the rotary, which has a subway underneath. Alternatively, the milk panels 400A1-400A4 and dip panels 400B1-400B4 can be installed in the subway on an inner side of the rotary platform.

Figure 5C:
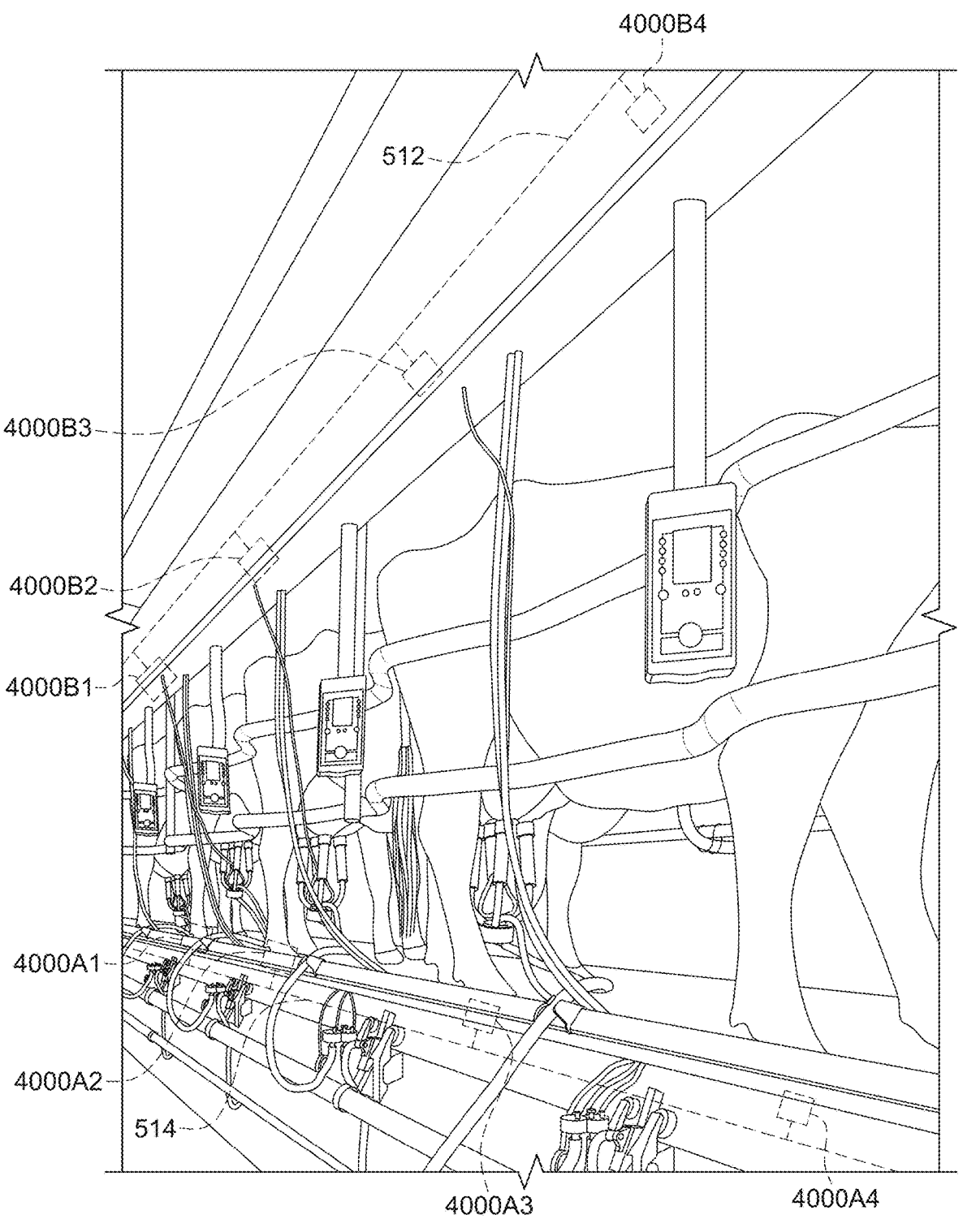

Referring now to FIG. 5C, a herringbone parlor can include the milk panels 400A1-400A4 and the dip panels 400B1-400B4 communicatively coupled in a similar manner to that described above in connection with the line parlor, and accordingly the communication lines between panels is not illustrated for purposes of clarity. The dip panels 400B1-400B4 can be installed in the upper housing 512 and the milk panels 400A1-400A4 can be installed inside of the lower panel 514.

Figures 6A, 6B:
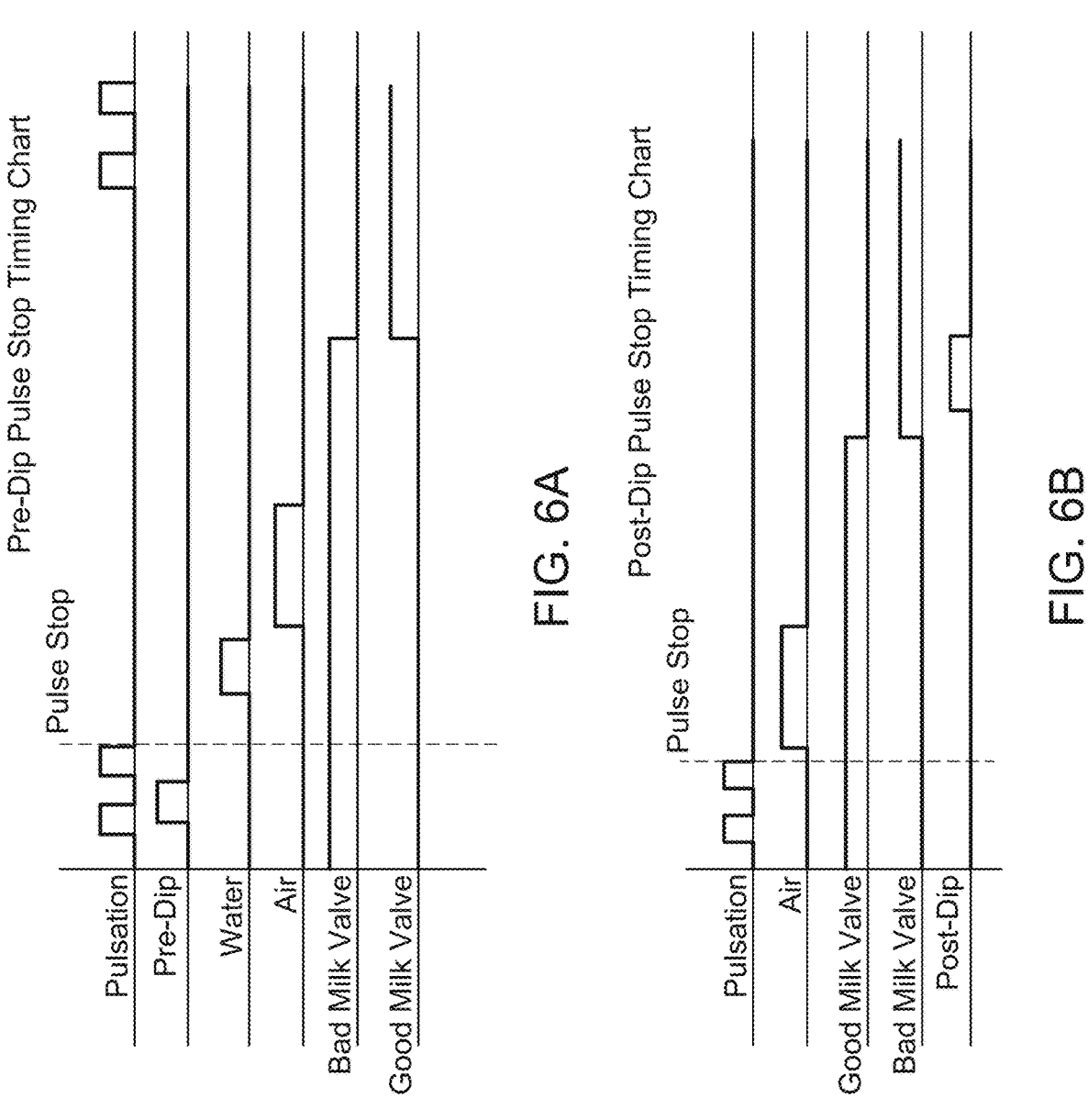
FIGS. 6A and 6B are timing diagrams for the operation of the milking system according to embodiments.
Figure 7A:
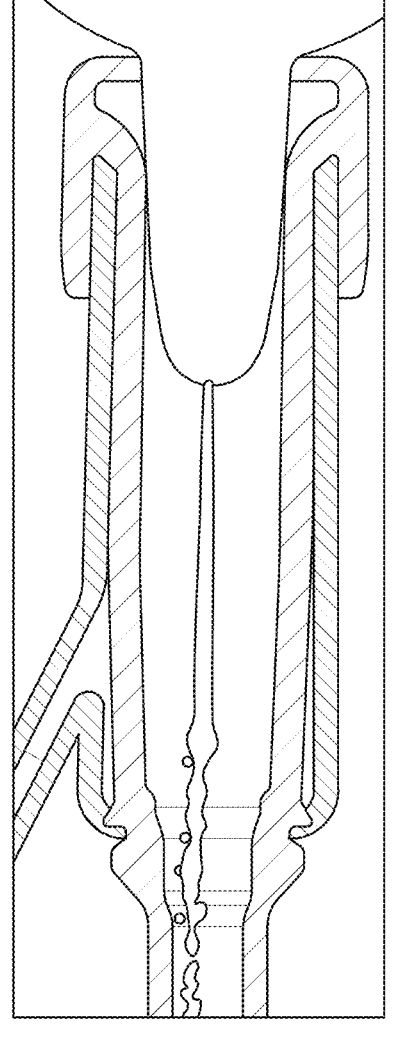
FIGS. 7A and 7B respectively illustrate open and closed liners according to embodiments.
Figure 7B:
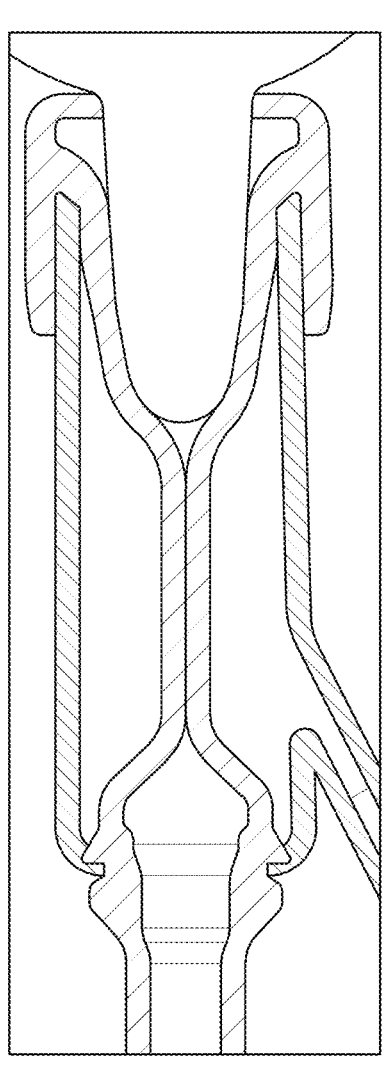

FIGS. 6A and 6B are timing diagrams of the pre-dip and post-dip process, respectively. Turning first to FIG. 6A, the pre-dip process starts with the bad milk valve 308 in an open position and the good milk valve 306 in the closed position. With the valves in those positions, the pulsator 124 applies pulses to each teat at a first pulsation rate. This first pulsation rate is used to stimulate the teats, and as illustrated in FIG. 7A the liner in each teat cup is open when the pulses are supplied. After the first pulse has begun, the pre-dip is supplied to each teat. After applying, in this non-limiting example, two pulses, the pulsator 124 pauses the application of pulses (or changes the pulsation to a more closed ratio, such as, for example, 5% open and 95% closed) and then water is supplied to each of the teat cups, followed by air to purge water, pre-dip, foremilk, and debris from the cluster down past the bad milk valve 308. As illustrated in FIG. 7B, the cessation of pulses causes the liners 112B to be subject to atmospheric pressure, which causes the liners 112B to close, i.e., the liners are fluidically isolated from the bad line. A predetermined period of time of this purge, the bad milk valves 308 are closed and the good milk valves 306 are opened. Then, after another predetermined period of time, the milking process begins and the pulsator 124 applies pulses to each teat at a milking pulsation rate. Opening the good milk valves 306 prior to the application of the pulses at the milking pulse rate results in an amount of milk collected in the liners 112B to flow into the good milk container 102. Although this amount of milk is relatively small on a per dairy animal basis, the amount of good milk that can be collected when this is applied across a number of dairy animals can result in significantly more milk collected. In contrast, when pre-dip is manually applied to the teats and then the milking cluster 112 is manually attached to the teats, a certain amount of milk collected will be directed to the bad milk container 104 to ensure that pre-dip does not mix with the milk in the good milk container 102.

Turning now to FIG. 6B, once the milking is complete (and assuming that the collected milk was good milk), the valves of the good milk line are maintained open, the valves of the bad milk line are maintained closed, and the post-dip process begins by the pulsator 124 continuing to apply pulses to each teat at the same pulsation rate as is used during milking. A predetermined time after the cessation of pulses by the pulsator 124 (which then causes the liners 112B to be subject to atmospheric pressure, and therefore the liners 112B close), air is supplied to the milking cluster 112 to purge any remaining milk out of the milking cluster 112 and past the good milk valve 306. This purging helps collect any residual milk remaining in the liners 112B prior to the application of the post-dip. Another predetermined time after the application of air, the valves of the good milk line are closed and the valves of the bad milk line are opened. After a further predetermined period of time, the post-dip is supplied to each teat. The post-dip is later cleaned from the teat cups during a backflush operation that is performed following a complete milking cycle.

Figure 8:
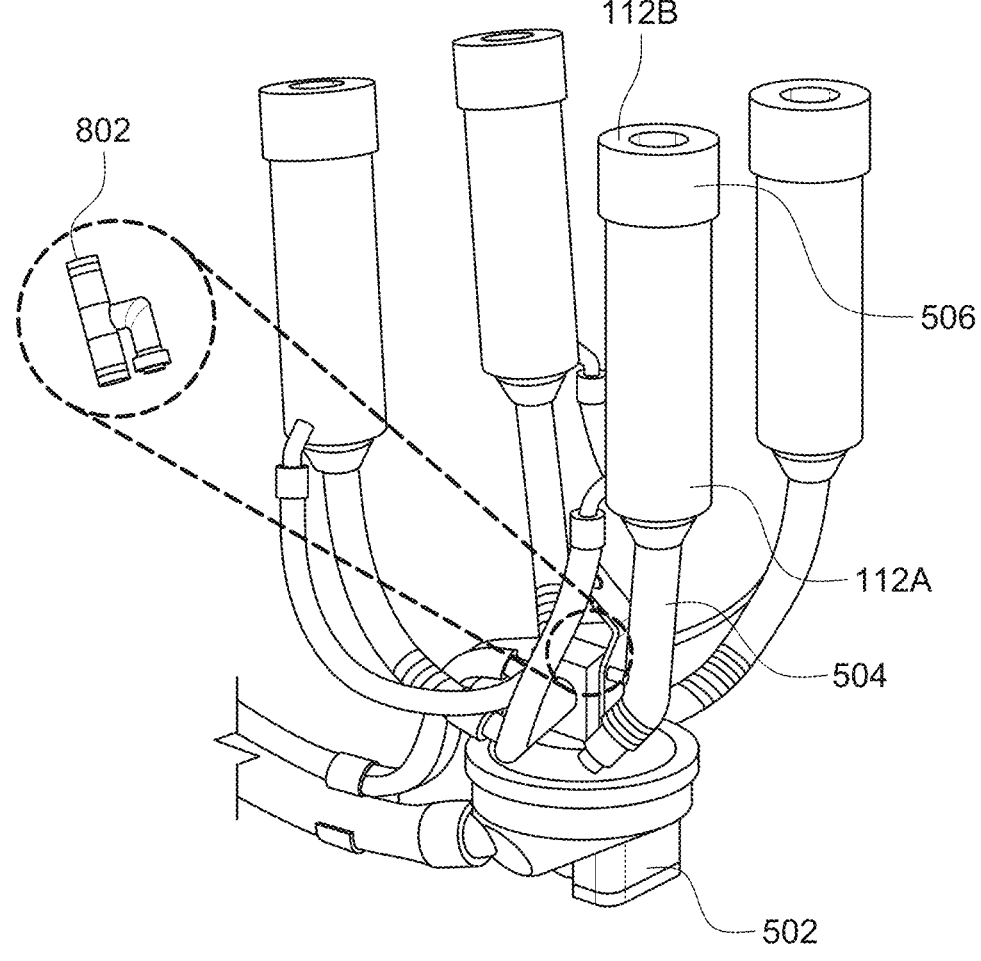
FIG. 8 illustrates a milking cluster according to embodiments.

FIG. 8 illustrates a non-limiting example of a milking cluster 112 that can be used in the disclosed systems and methods. A manifold 502 is coupled to the good milk line, the bad milk line, the air line, the water line, the pre-dip line, and the post-dip line, with control of the fluids passing into the manifold being controlled by the valves described above. The manifold 502 is coupled to the short milk lines 504 (only one of which is labeled), which is coupled to the downstream end of the liner 112B in the teat cup 112A. The pre-dip and post-dip is supplied to the liner via the pre-/post-dip injection nozzle 506. The water injection nozzle 802 can be coupled to each of the short milk lines 504 (also commonly referred to as short milk tubes) as illustrated in FIG. 8 or can be directly coupled to the milking cluster 502.

Figure 9A:
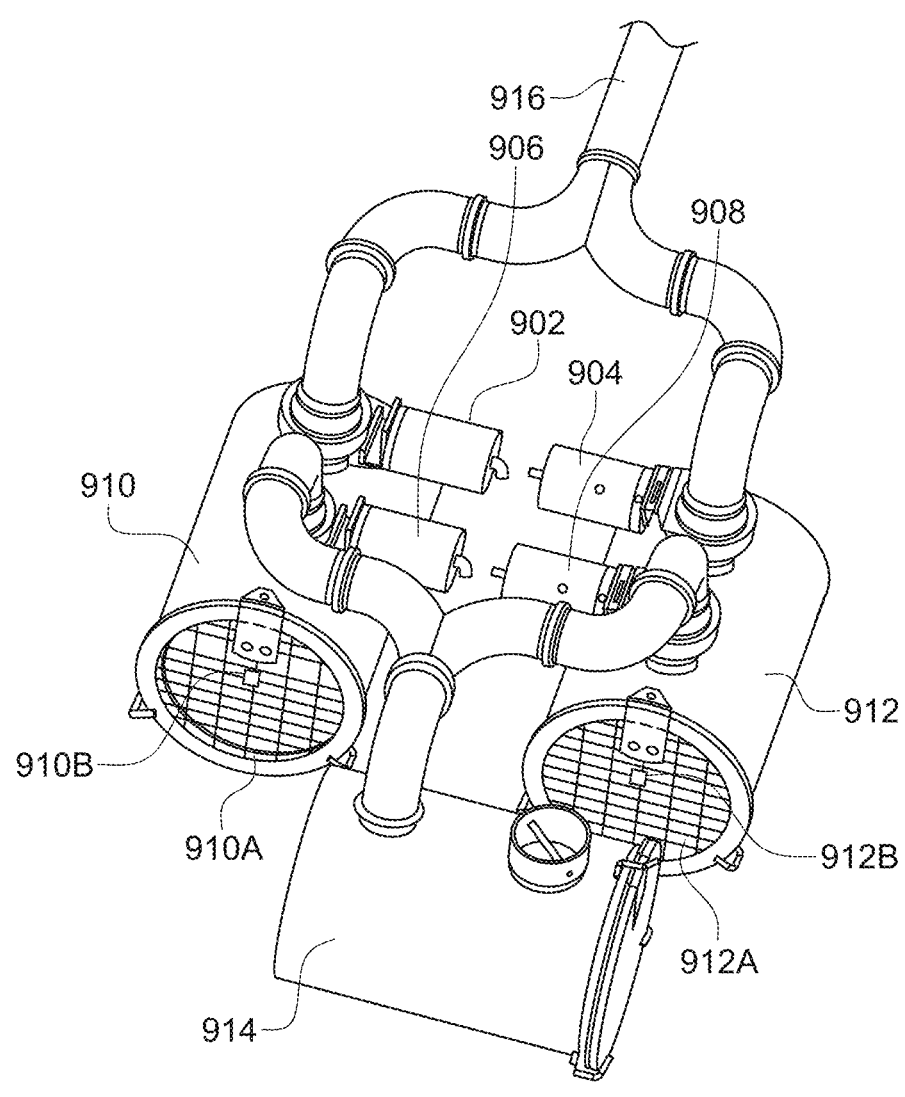
FIGS. 9A and 9B illustrate a vacuum supply receiver according to embodiments.
Figure 9B:
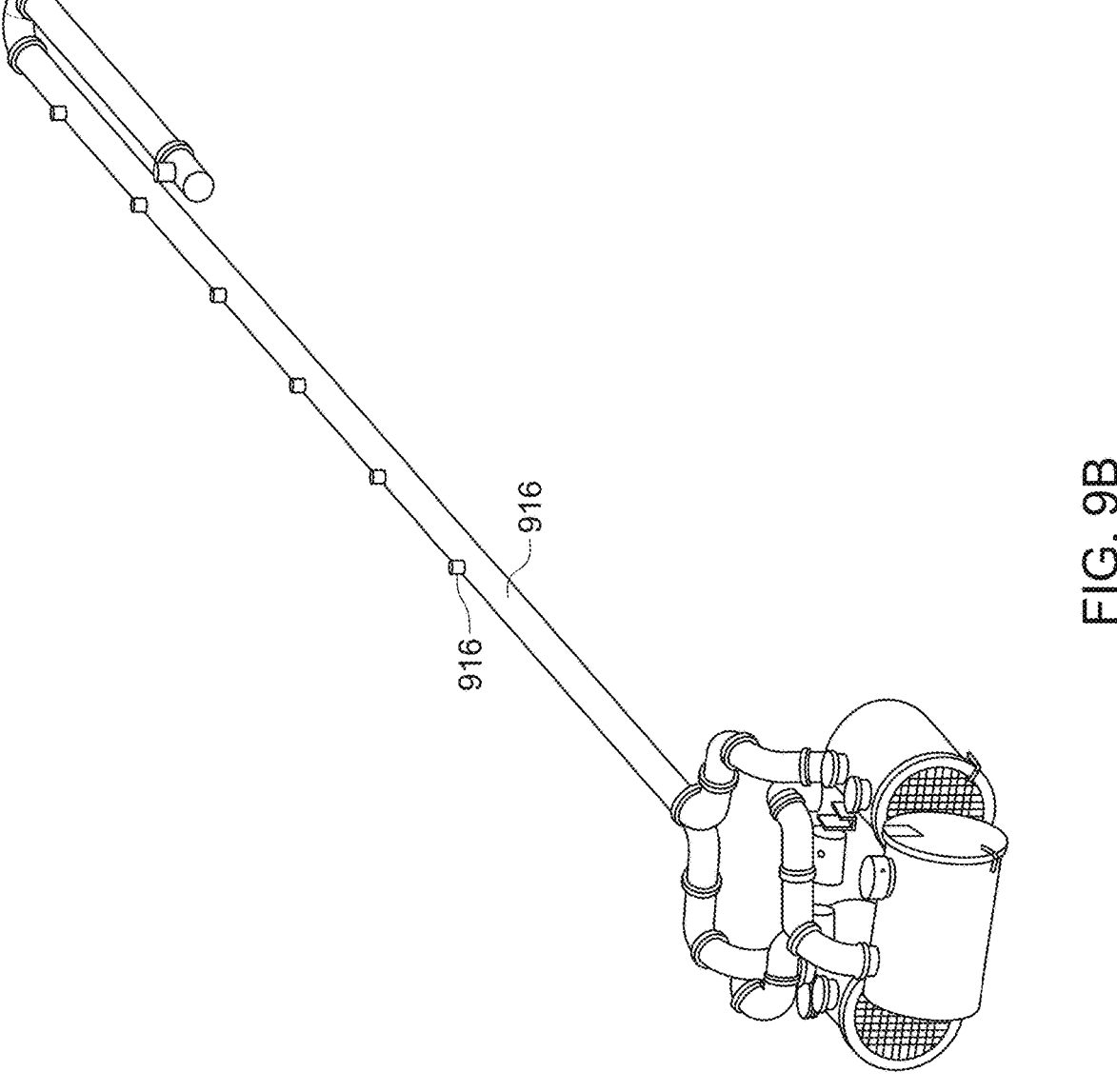

Those skilled in the art understand that the disclosed milking systems operate using a vacuum. A non-limiting example of a vacuum supply receiver that can be used with the disclosed systems is illustrated in FIGS. 9A and 9B. The vacuum receiver includes four air operated butterfly valves 902-908 that open and close the vacuum supply from the system pump. The receiver also includes two tanks 910 and 912, each of which includes a clear window 910A and 912A, on which is arranged a liquid fill sensor 910B and 912B to measure the liquid level in the respective tanks. When one of the liquid fill sensors 910B and 912B detect that the tank has filled to a particular level, the pumps on that side of the receiver are shut-off, which opens a flap so that the liquid flows into receiver tank 914.

Both tanks 910 and 912 are coupled to a common line 916, which as illustrated in FIG. 9B, includes a plurality of inlets 916A (only one of which is labeled) that are coupled to one of the milking clusters in the parlor.

As will be appreciated from the discussion above, the disclosed systems and methods automate the pre- and post-dip processes by performing them within the teat cup liners, and accordingly once the teat cups are manually attached to the teats, the pre-dip, milking, and post-dip processes can be performed within the liners. The disclosed systems and methods accommodate the limited space of existing milking parlors, in which only milking is performed in the liners of the teat cups and pre- and post-dipping is performed manually. Accordingly, the disclosed systems and methods do not require robot arms to move the milking cluster from a storage position into the milking position and attaching the teat cups to the teats. Nor do the disclosed systems and methods require the sensors to identify the teats for operation of the robot arm and the associated algorithms for controlling the teat identification and attachment. Performing the pre-dip, milking, and post-dip processes within the liner provides a more efficient process, does not require reconfiguration of existing milking parlors, and does not require the additional expenses required for the automatic teat attachment by the robot arm and sensor.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The disclosed embodiments provide milking systems and methods that allow pre-dip, post-dip, and milking processes to be performed within the liner of a teat cup that is manually attached to the dairy animal's teats. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A dairy animal milking system, comprising:
a good milk container;
a bad milk container;
a pre-dip storage container;
a post-dip storage container; and
a milking stall configured to accommodate a dairy animal for milking, the milking stall comprising
a milking cluster comprising a plurality of teat cups, a liner arranged at least partially in each of the plurality of teat cups, and a pulsation chamber arranged between each of the plurality of teat cups and the liner at least partially arranged therein;
a support affixed to one of the sides of the milking stall and configured for detachment of the milking cluster from the one of the sides of the milking stall;
a first fluid line fluidically coupling, via at least one first valve, an interior of each of the plurality of liners to the pre-dip storage container and fluidically coupling, via at least one second valve, the interior of each of the plurality of liners to the post-dip storage container;
a second fluid line fluidically coupling, via at least one third valve, a downstream end of each of the plurality of liners with the good milk container and fluidically coupling, via at least one fourth valve, the downstream end of each of the plurality of liners with the bad milk container;
a pulsator fluidically coupled with the pulsation chamber between each of the plurality of teat cups and the liners arranged at least partially therein;
a switch; and
a processor coupled to the at least one first valve, the at least one second valve, the at least one third valve, the at least one fourth valve, the pulsator, and the switch, wherein, responsive to activation of the switch, the processor is configured to
control the at least one first valve to fluidically couple the pre-dip storage container with an interior of each of the plurality liners and control the at least one fourth valve to fluidically couple the bad milk container with the downstream end of each of the plurality liners;
control the pulsator to apply a first pulsation rate to the pulsation chamber between each of the plurality of teat cups the liners arranged at least partially therein while the pre-dip is being supplied;
control the at least one first valve to isolate the pre-dip storage container from the interior of each of the plurality of liners;
change, after isolating the pre-dip storage container, a pulsation rate of the pulsator of pulses applied to the pulsation chamber between each of the plurality of teat cups and the liners to a pulsation ratio with an increased percentage of closing time of the teat cups;
control a water valve to open to supply water to lines coupling the liners to a manifold of the milking cluster and then control the water valve to close;
control an air valve to open to supply air to the lines coupling the liners to the manifold of the milking cluster and then control the air valve to close;
control at least one third valve to fluidically couple the downstream end of each of the plurality of liners with the good milk container;
control, after the pulsator changes the pulsation rate of the pulsator to the pulsation ratio with an increased percentage of closing time of the teat cups and while the downstream end of each of the plurality of liners is fluidically coupled with the good milk container, the pulsator to apply a second pulsation rate to the pulsation chamber between each of the plurality of teat cups the liners arranged at least partially therein; and control the at least one second valve to fluidically couple the post-dip storage container with the interior of each of the plurality of liners, control the at least one third valve to fluidically isolate the good milk container from the downstream end of each of the plurality of liners, and control the at least one fourth valve to fluidically couple the bad milk container to the downstream end of each of the plurality of liners.

2. The milking system of claim 1, wherein the at least one first valve and at least one second valve are arranged on a first panel, the at least one third valve and at least one fourth valve are arranged on a second panel, and the first and second panels are separate panels in the system.

3. The milking system of claim 2, wherein the milking stall is arranged on a rotary platform, the first panel is arranged in a housing on the rotary platform, and the second panel is arranged below the rotary platform.

4. The milking system of claim 2, wherein the milking stall is arranged on a rotary platform, and the first and second panels are arranged in a subway below the rotary platform and on an inner side of the rotary platform.

5. The milking system of claim 2, wherein the milking stall is arranged on a line platform with other milking stalls, the first panel is arranged behind an upper housing above the line platform, and the second panel is arranged below the line platform.

6. The milking system of claim 2, wherein the milking stall is arranged in a herringbone pattern with other milking stalls on a platform, the first panel is arranged behind an upper housing above the platform, and the second panel is arranged below the platform.

7. The milking system of claim 1, wherein the at least one third valve includes a good milk valve and the at least one fourth valve includes a bad milk valve, wherein the processor is further configured to:

control the bad milk valve into an open position and the good milk valve into a closed position until a predetermined time after the air valve is closed and then control the bad milk valve into a closed position and the good milk valve into a closed position.

8. The milking system of claim 1, wherein prior to controlling the at least one second valve to fluidically couple the post-dip storage container with the interior of each of the plurality of liners and to controlling the at least one fourth valve to fluidically couple the bad milk container to the downstream end of the liners, the processor is configured to:

control the pulsator to stop applying pulses to the pulsation chamber between each of the plurality of teat cups the liners to fluidically isolate the liners from the milking system;

control an air valve to open to supply air to lines coupling the liners to a manifold of the milking cluster; and control the at least one third valve to fluidically isolate the good milk container from the downstream end of each of the plurality of liners and to fluidically couple the bad milk container to the downstream end of each of the plurality of liners.

9. The milking system of claim 1, wherein the at least one third valve includes a good milk valve coupling the downstream end of the liners to good milk container and the at least one fourth valve is a bad milk valve coupling the downstream end of the liners to the bad milk container.

10. The milking system of claim 1, wherein the milking stall does not include a robotic arm coupled to the milking cluster to affix teats of the dairy animal in the liners.

11. A method for milking a dairy animal, the method comprising:

manually attaching a milking cluster of a milking system to the dairy animal by manually inserting each of a plurality of teats of the dairy animal into a corresponding one of a plurality of teat cups, wherein each of the plurality of teat cups includes a corresponding liner at least partially disposed within the teat cup;

activating a milking of the dairy animal with the manually attached milking cluster, wherein the milking of the dairy animal comprises controlling at least one first valve to fluidically couple a pre-dip storage container with an interior of each of the plurality of liners via a first fluid line and controlling at least one fourth valve to fluidically couple a bad milk container with the downstream end of each of the plurality of liners;

performing a pre-dip application on each of the plurality of teats by supplying pre-dip to the interior of each of the plurality liners;

operating a pulsator at a first pulsation rate to a pulsation chamber arranged between each of the teat cups and each of the corresponding liners and directing the pre-dip to a waste milk line;

controlling the at least one first valve to isolate the pre-dip storage container from the interior of each of the plurality of liners;

changing, by the pulsator and after isolating the pre-dip storage container, a pulsation ratio of pulses applied to the pulsation chamber between each of the plurality of teat cups to a pulsation ratio with an increased percentage of closing time of the teat cups;

controlling a water valve to open to supply water to lines coupling the liners to a manifold of the milking cluster and then control the water valve to close;

controlling an air valve to open to supply air to the lines coupling the liners to the manifold of the milking cluster and then control the air valve to close;

controlling at least one third valve to fluidically couple the downstream end of each of the plurality of liners with a good milk container;

operating, after the pulsator stops applying the pulses and while the downstream end of each of the plurality of liners is fluidically coupled with the good milk container, the pulsator at a second pulsation rate to the pulsation chamber to draw milk from each of the plurality of teats;

controlling at least one second valve to fluidically couple a post-dip storage container with the interior of each of the plurality of liners via the first fluid line, controlling the at least one third valve to fluidically isolate the good milk container from the downstream end of each of the plurality of liners, and controlling the at least one fourth valve to fluidically couple the bad milk container to the downstream end of each of the plurality of liners; and performing, after drawing milk from each of the plurality of teats, a post-dip application on each of the plurality of teats by supplying post-dip to the interior of each of the plurality liners; and detaching the milking cluster by removing each of the plurality of teats from the corresponding one of the plurality of teat cups.

12. The method of claim 11, wherein the at least one third valve includes a good milk valve and the at least one fourth valve includes a bad milk valve, the method further comprising:

opening the bad milk valve and closing the good milk valve until a predetermined time after the air valve is closed and then closing the bad milk valve and opening the good milk valve.

13. The method of claim 11, wherein prior to controlling the at least one second valve to fluidically couple the post-dip storage container with the interior of each of the plurality of liners and to controlling the at least one fourth valve to fluidically couple the bad milk container to the downstream end of each of the plurality of liners, the method further comprising:

stopping the pulsator from applying pulses to the pulsation chamber between each of the plurality of teat cups and the liners to fluidically isolate the liners from the milking system;

opening an air valve to supply air to lines coupling the liners to the manifold of the milking cluster; and controlling the at least one third valve to fluidically isolate the good milk container from the downstream end of each of the plurality of liners and controlling the at least one fourth valve to fluidically couple the bad milk container to the downstream end of each of the plurality of liners.

14. The method of claim 11, wherein the activating of the milking is responsive to actuation of a switch, which is actuated prior to the manual attachment of the milking cluster.

\* \* \* \* \*